United States Patent
Deiss

(10) Patent No.: US 8,349,426 B2
(45) Date of Patent: *Jan. 8, 2013

(54) SEALING TAPE OF SOFT FOAM

(75) Inventor: Martin Deiss, Abtsgmuend (DE)

(73) Assignee: ISO-Chemie GmbH (DE)

( * ) Notice: Subject to any disclaimer, the term of this patent is extended or adjusted under 35 U.S.C. 154(b) by 742 days.

This patent is subject to a terminal disclaimer.

(21) Appl. No.: 12/448,382

(22) PCT Filed: Nov. 30, 2007

(86) PCT No.: PCT/EP2007/010432
§ 371 (c)(1),
(2), (4) Date: Jun. 18, 2009

(87) PCT Pub. No.: WO2008/074389
PCT Pub. Date: Jun. 26, 2008

(65) Prior Publication Data
US 2010/0003465 A1  Jan. 7, 2010

(30) Foreign Application Priority Data

Dec. 18, 2006 (EP) .................................... 06026192
Sep. 27, 2007 (EP) .................................... 07019056

(51) Int. Cl.
*B32B 9/00* (2006.01)
*B32B 33/00* (2006.01)
*B32B 3/26* (2006.01)
*B32B 7/12* (2006.01)
*E04C 1/00* (2006.01)

(52) U.S. Cl. .................... 428/40.1; 428/158; 428/304.4; 428/317.1; 428/317.3; 52/309.1; 52/309.4; 52/309.5

(58) Field of Classification Search ................. 428/40.1, 428/906, 41.7, 41.8, 158, 304.4, 317.1, 317.3; 52/309.1, 309.4, 309.5, 309.7
See application file for complete search history.

(56) References Cited

U.S. PATENT DOCUMENTS

| | | |
|---|---|---|
| 3,713,263 A | 1/1973 | Mullen |
| 4,181,711 A | 1/1980 | Ohashi et al. |
| 4,204,373 A | 5/1980 | Davidson |
| 4,356,676 A | 11/1982 | Hauptman |
| 7,754,304 B1 * | 7/2010 | Hohmann, Jr. ............... 428/40.1 |
| 7,874,121 B1 * | 1/2011 | Hohmann, Jr. ............. 52/717.01 |
| 8,241,721 B2 * | 8/2012 | Deiss ........................... 428/40.1 |

FOREIGN PATENT DOCUMENTS

| | | |
|---|---|---|
| DE | 17 84 467 | 11/1971 |
| DE | 24 57 322 | 6/1976 |
| DE | 41 23 647 | 12/1992 |

(Continued)

*Primary Examiner* — Patricia Nordmeyer
(74) *Attorney, Agent, or Firm* — Jansson Shupe & Munger Ltd.

(57) ABSTRACT

A sealing tape roll comprising a soft foam strip (1) of rectangular cross section formed into a roll with two outer lateral surfaces (1*a*), a top surface, and a bottom surface, and at least one film strip (3), which covers at least one of the lateral surfaces (1*a*) of soft foam strip (1). Two portions (5*a*, 5*b*) of film strip (3) are attached adhesively to soft foam strip (1), wherein at least one of the portions (5*a*, 5*b*) is located on the bottom surface or top surface of soft foam strip (1) and is arranged between adjacent turns within the roll.

7 Claims, 1 Drawing Sheet

FOREIGN PATENT DOCUMENTS

| | | |
|---|---|---|
| DE | 43 07 528 | 9/1994 |
| DE | 196 41 415 | 4/1998 |
| DE | 297 15 660 | 7/1999 |
| DE | 199 44 611 | 3/2001 |
| DE | 10 2004 012 473 | 10/2005 |
| EP | 0 072 955 | 8/1982 |
| WO | WO 98/45565 | 10/1998 |

* cited by examiner

SEALING TAPE OF SOFT FOAM

FIELD

The present invention pertains to a sealing tape of soft foam.

BACKGROUND

Sealing tapes of soft and flexible foam material are used in the construction industry to provide a seal against drafts and driving rain. For household use by the end user, there are generally known foam tapes with a thickness of usually a few millimeters, which are provided on one side with a layer of a pressure-sensitive adhesive covered by a cover film and are wound up uncompressed into rolls. They are used between window or door panels and the window or door frames to seal leaky windows and doors. For this purpose, they are adhered to suitable points on the panel or frame.

In the professional building construction industry, sealing tapes, usually impregnated, of soft and flexible foam material are used between window and door frames and the masonry. These types of sealing tapes can be up to a few centimeters thick and are usually provided on one side with a self-adhesive layer, by means of which they can be adhered to the frame profile elements of windows and doors. So that a component which has been provided with the sealing tape can be installed more easily at the construction site, sealing tapes of this type are frequently impregnated with a material which delays the recovery of the foam material from its compressed state, i.e., the state in which it has been delivered on a roll, back to the expanded state.

To prevent the diffusion of vapor, it is necessary to use sealing tapes of the previously mentioned type which have been provided with a vapor barrier. A sealing tape of open-pored material which has been rolled up into a disk and which is used to seal joints or gaps against drafts and driving rain is known from DE 196 41 415 C2, in which at least one barrier layer is arranged inside the sealing tape in such a configuration that it and the adjacent open-pored areas form a row in the axial direction. The barrier layer therefore extends in the radial direction of the sealing tape roll.

WO 98/45565 shows a sealing tape with a removable film coating, which covers three sides of the sealing tape in the compressed state.

SUMMARY

It is an object of the present invention to provide an easy-to-produce sealing tape equipped with a film strip.

According to an aspect of the invention, the sealing tape roll comprises a soft foam strip of rectangular cross section formed into a roll, which strip has two outer lateral surfaces, a top surface, and a bottom surface, and at least one film strip, which covers at least one of the lateral surfaces of the soft foam strip. Two portions of the film strip are attached, and preferably bonded adhesively, to the soft foam strip, wherein at least one of the portions is located on the bottom surface or on the top surface of the soft foam strip and is arranged between adjacent turns within the roll.

A basic distinction can be made between sealing tapes of soft, flexible foam material which are delivered in the compressed state and those which are delivered in the uncompressed state. The invention can be applied in principle in almost the same way to both types of tape.

The film strip is either attached to at least one lateral surface or adhered by one of its edge portions to the bottom surface of the foam strip. Preferably, the bottom surface of the foam strip is used to adhere the sealing tape to the structural element to be sealed, such as a frame profile element of a window or door. The bottom surface of the foam strip can be provided with a self-adhesive layer, which then also holds the film strip in place.

The film strip is wide enough to extend completely over the adjacent exposed lateral surface of the sealing tape even after the structural component has been installed, i.e., after the foam strip, which forms the main component of the sealing tape, has partially re-expanded.

The film strip preferably used is a vapor barrier film. The film strip, however, can also be a UV barrier film, which is intended to protect the foam material covered by it from the effects of UV rays. Films which are selected from an aesthetic standpoint, such as metallized or colored films, are also contemplated. In a preferred embodiment, the sealing tape of the present invention may include any type of film-like, flexible tape material, which is selected according to the individual requirements, including textile materials or laminates with several layers.

A significant advantage of the sealing tape according to preferred embodiments of the invention is that a completely mobile system is created, consisting of a soft, elastic foam strip and a film strip, wherein the film strip is formed into a loop in such a way that it can move across the entire functional area of the sealing tape. When the soft foam strip expands as a result of its elastic recovery after installation on a structural element, the reserve film strip material provided by the loop is available for movement along the lateral surface of the soft foam strip and is used up without the need for the film strip itself to stretch.

In contrast to the conventional method, the sealing tape according to the present invention can be produced in the form of narrow sealing tape rolls, also called sealing tape disks because of their dimensions, without the need for special measures to prepare the foam material for the production of the sealing tape disks. Instead, the process calls for providing such sealing tape disks with a flexible film, such as a vapor barrier film, in the form of a film strip, after the disks have been produced.

If, for example, the original height of the foam strip of the sealing tape is 30 mm and it has been compressed to a height of 4-5 mm in the roll, the manufacturer frequently limits its area of application to gaps, which are to be bridged by the sealing tape, of a certain width such as 15 mm. The reason for this is that, if the foam material were to be allowed to expand more than that, it would not rest tightly against the wall of the building.

The functional range of the sealing tape, which determines the width of the film strip to be selected, is therefore determined by the degree of compression of the foam material within the roll and the maximum recovery of the foam material after installation of the structural element to which the tape has been applied. The minimal thickness after compression of impregnated foam materials is currently about 10% of the original thickness. The recovery capacity after compression is sometimes not enough to allow the foam to return to its original thickness.

To ensure the sufficiently reliable adhesion of the film strip to the foam material of the sealing tape, it is sufficient that two portions of the film strip, each approximately 1-2 mm wide, are attached, preferably adhesively by means of a self-adhesive layer, to the foam material.

BRIEF DESCRIPTION OF THE DRAWINGS

Additional properties, features, and advantages of the invention can be derived from the detailed description below based on the drawings, which show in schematic fashion cross sections of several exemplary embodiments of sealing tapes according to the invention.

DETAILED DESCRIPTION

Figure 1:
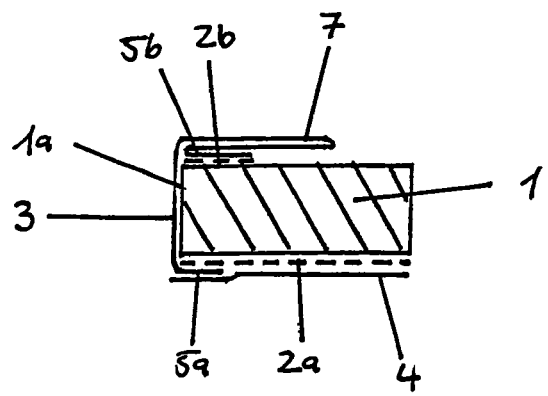
FIG. 1 shows a first embodiment of the sealing tape according to the invention in the wound-up, compressed state.
Figure 3:
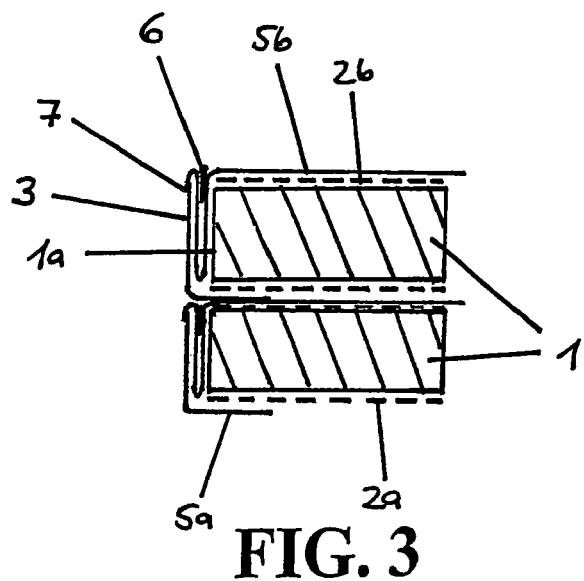
FIG. 3 shows a second embodiment of the sealing tape according to the invention in the wound-up, compressed state.

All of the drawings show a foam strip, an adhesive layer, the film strip, and part of the cover film in a way which makes it appear that they are a certain distance apart from each other. This is to illustrate more clearly how these elements are positioned with respect to each other. It should therefore be emphasized that the elements are resting right on top of each other and are pressed onto each other and are thus in mutual contact. It should also be emphasized that all the figures show cross sections of a sealing tape. FIGS. 1 and 3 show the state which is to be found when the sealing tape is wound up in the compressed state on a winding core.

FIG. 1 depicts a foam strip 1, which is shown in the compressed state. In this state, it has a flat, rectangular cross section and is provided with a first layer 2a of pressure-sensitive adhesive on one side, which is to be referred to as the "bottom surface" here and in the case of all the illustrated preferred embodiments to be explained below. This self-adhesive layer 2a is shown in broken line. A portion 5a of a film strip 3 is attached to the bottom surface of foam strip 1 by means of this first self-adhesive layer 2a. Film strip 3 is guided upward across a lateral surface 1a and around foam strip 1, formed into a loop 7 on the top surface of foam strip 1, and attached, preferably adhesively, to the top surface of foam strip 1 by a portion 5b near lateral surface 1a. Portion 5b is attached preferably by means of a second self-adhesive layer 2b, but, like the attachment of portion 5a, it can also be done by means of some other type of adhesive.

Portion 5a of film strip 3 adheres to self-adhesive layer 2a can and be provided with a plurality of openings or holes. On the bottom surface of foam strip 1, film strip 3 is covered by a cover film 4 to prevent the various layers of a coil from sticking together. The openings or holes in film strip 3 are large enough that, by pressing cover film 4 down, it can be adhered through the holes of the film strip to self-adhesive layer 2a. Alternatively, if portion 5a of film strip 3 does not comprise any openings, cover film 4 can extend only up as far as portion 5a.

Loop 7 forms the expansion reserve and simultaneously defines the maximum degree of expansion. As film strip 3 is formed into a loop, the film strip slides very easily over itself as the foam expands.

In the present exemplary embodiments, both portions 5a, 5b of film strip 3 are bonded to the foam, i.e., one to the bottom surface, the other to the top surface, and thus lie, when in the rolled-up state, between different layers of the roll. It is also possible, however, to bond one of the two portions 5a, 5b to the upper or lower edge of the lateral surface 1a, as long as the overall lateral surface 1a remains covered by film strip 3.

Figure 2:
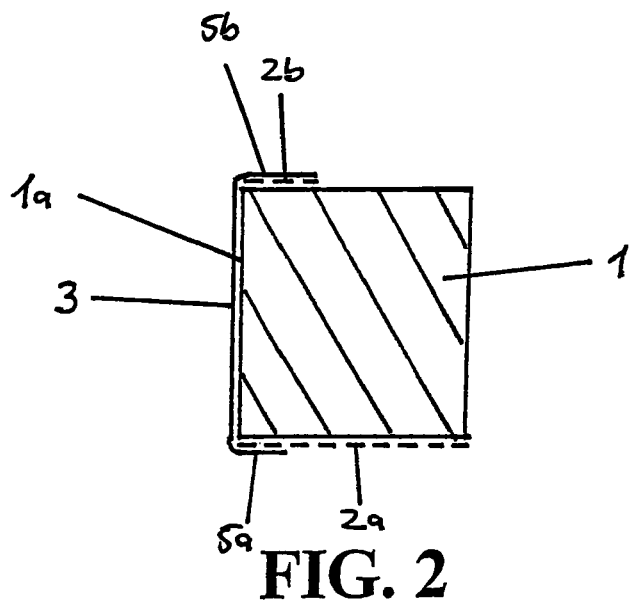
FIG. 2 shows the sealing tape of FIG. 1 in the partially compressed, functional state.

FIG. 2 shows the sealing tape of FIG. 1 in the partially expanded, functional state.

FIGS. 1 and 2 thus illustrate the operation of the sealing tape of the present invention. FIG. 1 shows the state of the sealing tape on the roll, although the roll itself is not shown. This is also the state in which the sealing tape is found immediately after it has been taken from the roll, provided that foam strip 1 has been impregnated with a recovery-delaying agent. Over the further course of time, foam strip 1 expands upward due to the elastic recovery force intrinsic to the foam material. This has the result that, in the area of loop 7, film strip 3 rolls over itself and slides across the upper edge between the lateral surface 1a covered by film strip 3 and the top surface of foam strip 1. At the end of the allowed expansion of foam strip 1, film strip 3 has slid almost completely off the top surface of foam strip 1 (FIG. 2) but is held in place by the adhered area in portion 5b and thus covers the entire lateral surface 1a of foam strip 1. This is the state which is present, for example, after a structural frame element equipped with the sealing tape has been installed in an opening in a building and has been sealed off by the sealing tape against the opening. It should be pointed out, however, that in this case cover film 4 has been pulled off, because the sealing tape is adhered to the frame element in question by means of self-adhesive layer 2.

FIG. 3 shows two layers of another embodiment of the sealing tape according to the invention, in which no cover film 4 is required. In this embodiment, portion 5b of the film strip 3 is adhered to the entire top surface of foam strip 1, and its outside-facing surface in this area is siliconized, as a result of which it assumes the function of cover film 4. Film strip 3 can project slightly beyond the free lateral surface.

Loop 7 formed in the area of covered lateral surface 1a. In addition, loop 7 can be bonded in that area with an adhesive 6 which releases only with a certain delay and which allows foam strip 1 to expand but only at the rate determined by adhesive 6 just mentioned. In addition, such an adhesion point also makes it easier to handle the sealing tape, because loop 7 cannot unfold in an undesirable manner.

While the invention has been described and illustrated in conjunction with specific preferred embodiments, it will be evident that many alternatives, modifications, variations and combinations will be apparent to those skilled in the art. Any such changes may be made without departing from the spirit and scope of the invention. The described and illustrated embodiments are to be considered in all respects only as illustrative and not restrictive. These and all similar modifications and changes are considered to be within the scope of the present invention.

The invention claimed is:

1. A sealing tape roll comprising:
   a soft foam strip of rectangular cross section formed into a roll having a plurality of turns, which strip has two outer lateral surfaces, a top surface, and a bottom surface; and
   at least one film strip, which covers at least one of the lateral surfaces of the soft foam strip;
   wherein two portions of the film strip are attached to the soft foam strip, and wherein at least one of the portions is located on the bottom surface or top surface of the soft foam strip and is arranged between adjacent turns within the roll; and
   wherein the film strip, in a compressed state of the soft foam strip, is formed into a loop which forms an expansion reserve.

2. The sealing tape roll according to claim 1, wherein an adhesive connection is formed on at least one of the portions by a self-adhesive layer.

3. The sealing tape roll according to claim 1, wherein the soft foam strip is compressed within the roll in an elastically recoverable manner.

4. The sealing tape roll according to claim 1, wherein the film strip is formed into the loop on the top surface or on a covered lateral surface of the soft foam strip.

5. The sealing tape roll according to claim 4, wherein the film strip is attached to the soft foam strip in an area of the top surface of the soft foam strip near a lateral surface covered by the film strip.

6. The sealing tape roll according to claim 1, wherein a cover film covers the bottom surface of the soft foam strip.

7. The sealing tape roll according to claim 1, wherein one side of the film strip is siliconized so that it can take over the function of a cover film.

* * * * *